(12) United States Patent
Danijel et al.

(10) Patent No.: US 12,139,958 B2
(45) Date of Patent: Nov. 12, 2024

(54) MOVEMENT CONTROL DEVICE

(71) Applicant: TITUS D.O.O. DEKANI, Dekani (SI)

(72) Inventors: Kozlovic Danijel, Dekani (SI); Svara Valter, Zola (SI); David Pecar, Pobegi (SI)

(73) Assignee: TITUS D.O.O. DEKANI, Dekani (SI)

( * ) Notice: Subject to any disclaimer, the term of this patent is extended or adjusted under 35 U.S.C. 154(b) by 106 days.

(21) Appl. No.: 17/921,674

(22) PCT Filed: Apr. 29, 2021

(86) PCT No.: PCT/EP2021/061251
§ 371 (c)(1),
(2) Date: Oct. 27, 2022

(87) PCT Pub. No.: WO2021/233657
PCT Pub. Date: Nov. 25, 2021

(65) Prior Publication Data
US 2023/0167664 A1    Jun. 1, 2023

(30) Foreign Application Priority Data

May 20, 2020  (GB) .................................... 2007523

(51) Int. Cl.
*E05F 5/02*       (2006.01)
*A47B 88/453*     (2017.01)
(Continued)

(52) U.S. Cl.
CPC ............ *E05F 3/108* (2013.01); *A47B 88/453* (2017.01); *A47B 88/477* (2017.01);
(Continued)

(58) Field of Classification Search
CPC ... A47B 88/453; A47B 88/473; A47B 88/477; E05F 3/00; E05F 3/10; E05F 3/14;
(Continued)

(56) References Cited

U.S. PATENT DOCUMENTS

| 4,660,250 A | 4/1987 | Tillman et al. |
| 5,657,969 A * | 8/1997 | Bivens ................. F16F 9/0254 16/84 |

(Continued)

FOREIGN PATENT DOCUMENTS

| CN | 104033014 A | 9/2014 |
| DE | 20315124 U1 | 2/2004 |

(Continued)

*Primary Examiner* — Chuck Y Mah
(74) *Attorney, Agent, or Firm* — Best & Flanagan LLP

(57) ABSTRACT

A movement control device comprising a housing with an elongate push rod mounted therein for reciprocal movement along a longitudinal axis between first and second positions, wherein the push rod extends out of said housing in both the first and second positions. A spring comprising a primary axis operable to provide a biasing force on the push rod is further provided in the housing. A damping device comprising a primary axis is located in the housing, wherein the damping device is in continuous engagement with the push rod through its reciprocating movement. The primary axis of the spring and the primary axis of the damping device are not coaxial.

22 Claims, 4 Drawing Sheets

(51) Int. Cl.
*A47B 88/477* (2017.01)
*E05C 19/02* (2006.01)
*E05F 3/10* (2006.01)
*F03G 1/10* (2006.01)
*F16F 13/00* (2006.01)

(52) U.S. Cl.
CPC .............. *E05C 19/022* (2013.01); *F03G 1/10* (2013.01); *F16F 13/007* (2013.01); *F16F 2228/12* (2013.01); *F16F 2232/08* (2013.01)

(58) Field of Classification Search
CPC ....... E05F 3/16; E05F 3/18; E05F 3/20; E05F 3/102; E05F 3/108; E05F 5/00; E05F 5/003; E05F 5/02; E05F 5/06; E05F 5/006; E05F 5/08; E05F 5/10; E05F 5/022; E05C 19/022; E05C 19/024; E05Y 2900/54; E05Y 2900/548; E05Y 2201/21; E05Y 2201/254; E05Y 2201/256; E05Y 2201/264; E05Y 2201/266; E05Y 2201/412; E05Y 2600/456; E05Y 2900/20; F03G 1/10; F16F 13/007; F16F 13/005; F16F 2228/12; F16F 2232/08
See application file for complete search history.

(56) References Cited

U.S. PATENT DOCUMENTS

| | | | | |
|---|---|---|---|---|
| 6,846,053 B2 * | 1/2005 | Salice | ................. | E05F 5/10 312/334.14 |
| 7,194,785 B2 * | 3/2007 | Li | ................. | E05F 5/006 16/85 |
| 7,273,240 B2 * | 9/2007 | Migli | ................. | E05C 19/165 292/332 |
| 9,103,144 B2 * | 8/2015 | Liang | ................. | E05C 17/62 |
| 9,516,948 B2 * | 12/2016 | Migli | ................. | A47B 88/463 |
| 9,771,750 B2 | 9/2017 | Held | | |
| 2007/0245518 A1 * | 10/2007 | Blair | ................. | E05F 5/04 16/85 |
| 2007/0251052 A1 * | 11/2007 | Pyo | ................. | E05F 5/10 16/86 A |
| 2008/0209674 A1 | 9/2008 | Harald et al. | | |
| 2009/0307869 A1 * | 12/2009 | Salice | ................. | E05C 19/165 16/85 |
| 2010/0263975 A1 * | 10/2010 | Vallance | ................. | E05F 5/02 188/322.18 |
| 2010/0270114 A1 * | 10/2010 | Herper | ................. | F16F 9/20 188/283 |
| 2012/0305351 A1 | 12/2012 | Kopto et al. | | |
| 2014/0109343 A1 * | 4/2014 | Chang | ................. | E05F 1/16 16/49 |
| 2015/0091424 A1 * | 4/2015 | Nuckolls | ................. | A47B 88/463 312/319.1 |
| 2016/0108656 A1 * | 4/2016 | Sugiura | ................. | E05F 1/1008 49/386 |
| 2017/0321464 A1 * | 11/2017 | Bortoluzzi | ................. | E05F 5/027 |
| 2018/0100338 A1 | 4/2018 | Dubach | | |
| 2018/0155972 A1 * | 6/2018 | Filges | ................. | E05F 3/00 |
| 2018/0231092 A1 * | 8/2018 | Pecar | ................. | F16F 9/19 |
| 2018/0266512 A1 | 9/2018 | Zimmer et al. | | |
| 2019/0069672 A1 * | 3/2019 | Pan | ................. | A47B 88/467 |
| 2020/0347837 A1 * | 11/2020 | Zimmer | ................. | F04B 7/0216 |
| 2021/0270072 A1 | 9/2021 | Held | | |

FOREIGN PATENT DOCUMENTS

| | | | | |
|---|---|---|---|---|
| EP | 1690473 B1 * | 5/2016 | ............ | A47B 88/40 |
| JP | 2006307533 A * | 11/2006 | | |
| WO | WO2019064061 A1 | 4/2019 | | |
| WO | WO2019238556 A1 | 12/2019 | | |

* cited by examiner

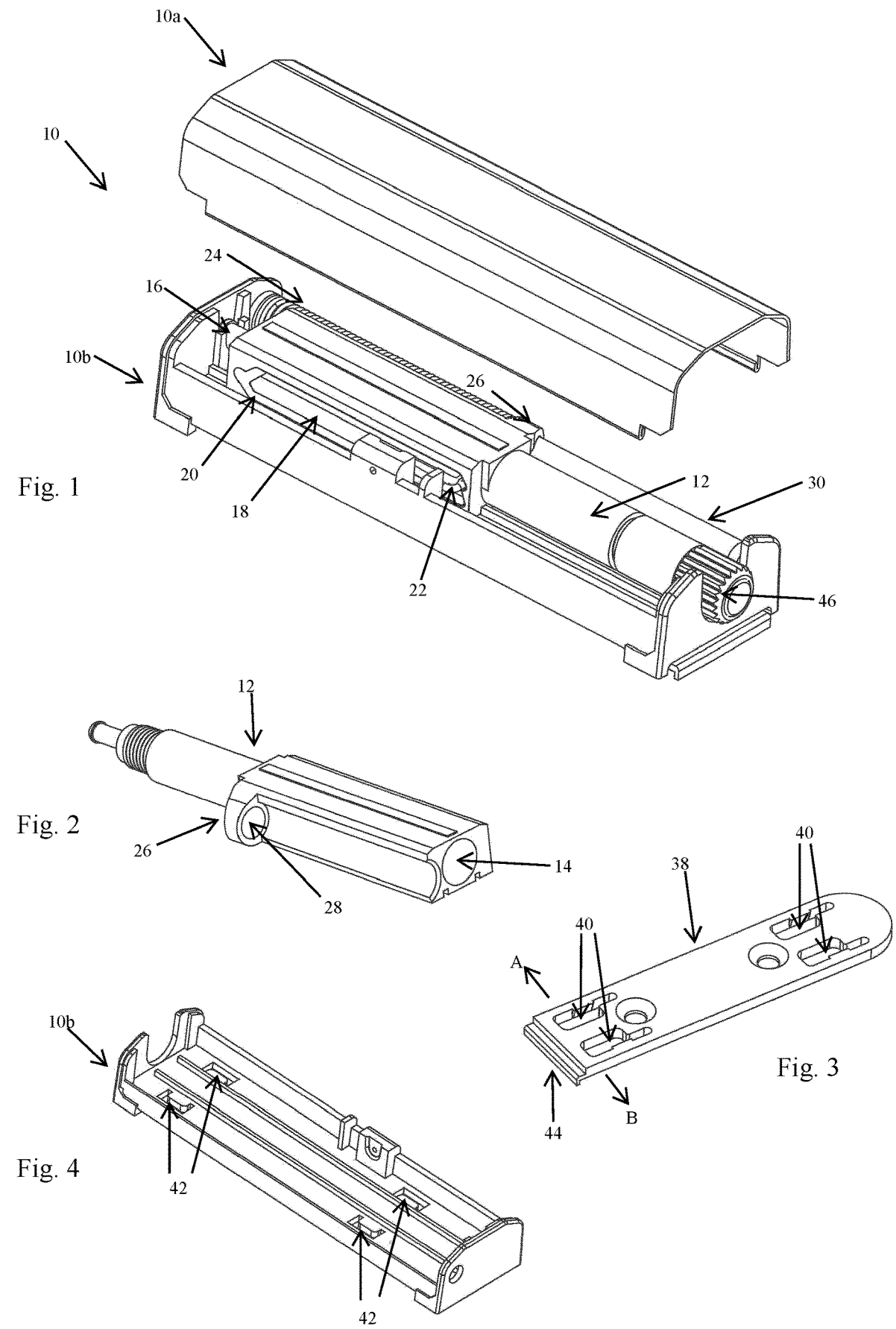

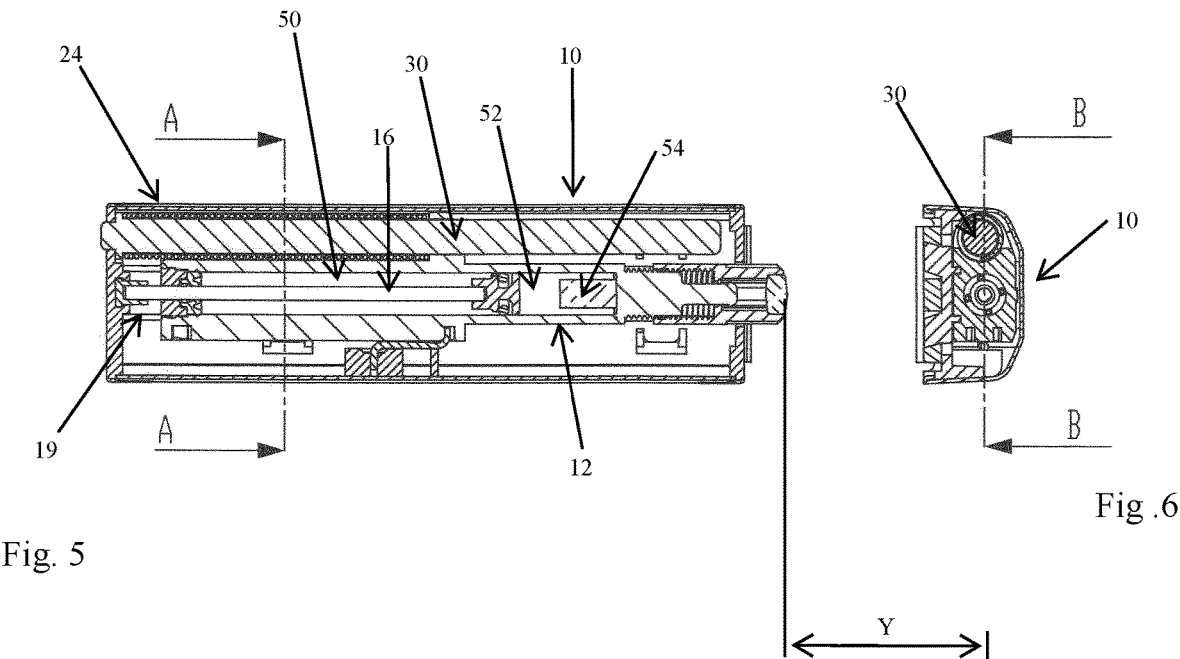
Fig. 5
Fig. 6
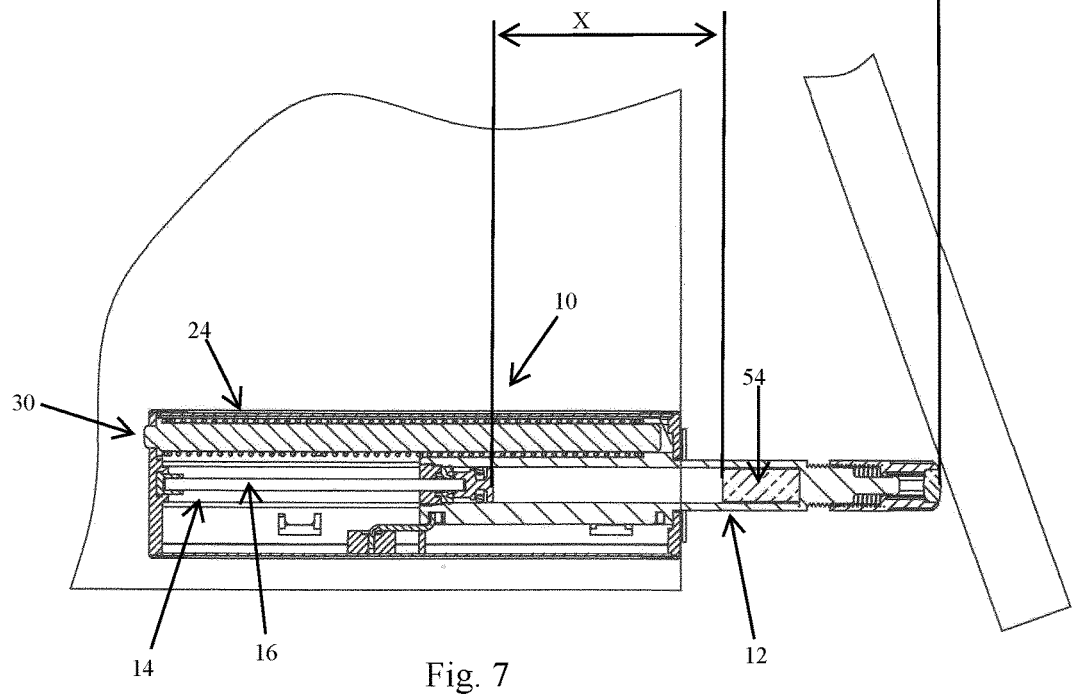
Fig. 7

MOVEMENT CONTROL DEVICE

FIELD OF THE INVENTION

The present invention relates to movement control devices, and particularly, although not exclusively, for furniture components such as drawers and doors.

BACKGROUND

The present arrangement seeks to provide a more stable product, whilst minimizing the overall size, and enhancing usability.

One type of movement control device is a push latch. Such devices are generally fitted to doors and drawers of furniture items. In use, an operator would push the drawer or door, hence actioning a push rod located within the push latch. The push latch thus opens the door or drawer by a small amount to allow the operator to be able to fit their fingers behind the drawer or door and complete the opening operation. Such push latches are popular because they negate the need for a handle to be included on the outer surface of the drawer/door.

However, known arrangements suffer from a variety of problems. These include being oversized. It will be appreciated that the storage space inside a drawer may be limited. It would be desirable for the push latch to not encroach too much into the space.

Further, some push latches can operate violently at the initial opening phase, causing the door/drawer to be quickly opened.

Due to influence of the door on the movement control device, lateral forces can act on the push rod and damper so as to cause friction that can deleteriously effect operation. This can be particularly prevalent on shorter doors that require the movement control device to provide a larger opening angle to allow proper function. Or, put another way, shorter doors abut at a wider angle on the push rod.

The present arrangement seeks to solve these and other problems.

SUMMARY OF THE INVENTION

According to the present invention there is provided a movement control device comprising a housing, an elongate push rod mounted in the housing for reciprocal movement along a longitudinal axis between first and second positions, wherein the push rod extends out of said housing in both the first and second positions, a spring comprising a primary axis operable to provide a biasing force on the push rod, and a damping device comprising a primary axis, wherein the damping device is directly or indirectly in substantially continuous engagement with the push rod through its reciprocating movement, wherein the primary axis of the spring and the primary axis of the damping device are not coaxial.

The present arrangement is advantageous in that the damping device is operable to act on the push rod through the extent of travel of the push rod. By making one of the spring or damper coaxial with the push rod, and mounting the second of the spring or damper to one side of the push rod the damping device can be kept to minimum length.

Preferably the movement control device comprises an indexing mechanism for controlling movement of the push rod relative to the housing.

Preferably the indexing mechanism is operable to maintain the push rod in either the first position or the second position.

The damping device may be a linear damper. This damper may be a piston and cylinder type damper. It is preferred that the damper provides a reducing force over its working stroke. The force of the spring will reduce as it expands, and hence it is desirable to correspondingly reduce the damper force so as to allow a substantially constant force on a drawer or door throughout the working stroke of the movement control device. Accordingly, it is preferred that the damper force has a degressive force characteristic.

It will be appreciated that the damper may alternatively produce a damped resistive force at a constant rate over its working stroke.

In one embodiment it is preferred the primary axis of the damping device is coaxial with the longitudinal axis of the pushrod.

Preferably the damping device is at least partially housed within the push rod. Typically the push rod will comprise a hollow core to allow the damper to be received therein. It is particularly preferred that the push rod, utilizing its hollow core, functions as the damper housing. Such an arrangement reduces the size of the movement control device. In a preferred arrangement the piston of the damper, together with damping fluid is assembled within the bore of the push rod.

It is preferred that the piston of the damper is movable with respect to the push rod. As the push rod is activated, the piston is caused to force damping fluid from a first chamber to a second chamber, thus causing the damping action.

The damping device may be provided as a separate unit that is slotted within the hollow core of the damping device.

It is preferred, in some embodiments, that the primary axis of the spring is substantially parallel to the longitudinal axis of the push rod.

The push rod may comprise a flange. In this arrangement the spring may be retained between the flange and the housing. Accordingly, the spring is set to one side of the push rod, with the primary axes of the spring and push rod being substantially parallel. Accordingly, the spring is operable to push on the flange to move the push rod from the first position to the second position. Providing the spring outside of the longitudinal axis of the push rod allows the damping device to be made shorter.

In an alternative embodiment, the spring may be mounted at least partially within the push rod. Typically, the push rod comprises a hollow core operable to receive the spring. In this embodiment the damping device may be mounted in the housing to one side of the push rod. In a similar manner to the first embodiment, by providing the damper outside of the longitudinal axis of the push rod allows the damping device to be made shorter.

The damping device may be pivotally mounted within the housing. Said mounting may be arranged such that movement of the push rod causes rotational movement of the damping device. In a preferred arrangement, the push rod comprises a flange that is operable to engage the damping device, such that primary axis of the damping device is caused to rotate with respect to the longitudinal axis of the push rod as said push rod moves from the first position to the second position.

The spring is typically a compression spring. As the spring expands it will exert less force over its path of travel. However, as the flange moves further away from the pivot, the flange exerts a greater force on the damper. Given that a moment is force multiplied by distance, as the spring force reduces, the distance increases, such that a substantially uniform damping force is ultimately provided. Of course, the arrangement could be tailored to produce a variety of different damping characteristics, depending on need.

The primary axis of the damping device and the longitudinal axis of the push rod may define an acute angle when the push rod is in the first position. The primary axis of the damping device and the longitudinal axis of the push rod may be substantially parallel when the push rod is in the second position.

The damper may be retained within a casing, with said casing being mounted for pivotal movement. At least one of the damper housing or damper piston may be slidable with respect to the casing.

According to a second aspect of the present invention there is provided a push latch comprising a push rod mounted to move between a first position and a second position with a housing, a spring operable to urge the push rod from the first position to the second position, wherein the spring is mounted substantially parallel to, but not co-axial with, the push rod, wherein the push latch further comprises a damping device that either directly or indirectly engages with the push rod throughout its travel between the first position and the second position.

According to a third aspect of the present invention there is provided a push latch comprising a push rod mounted to move between a first position and a second position with a housing, a damping device mounted in said housing, wherein, a primary axis of said damping device defines an acute angle with the push rod when said push rod is in the first position, and is parallel thereto when the push rod is in the second position.

In the third aspect the damping may be retained in a casing that is pivotally mounted in the housing. At least one of the damping device housing and the damping device piston rod may be slidably mounted within the casing.

In both the second and third aspects, the push latch preferably comprises an indexing mechanism for controlling movement of the push rod relative to the housing.

Preferably the indexing mechanism is operable to maintain the push rod in either the first position or the second position.

The damping device may be a linear damper. This damper may be a piston and cylinder type damper. The damper may produce a degressive force over its working stroke, or, in an alternative embodiment, the damper may produce a damped resistive force at a constant rate over its working stroke. The spring will provide a diminishing force as it expands from a fully compressed position to a fully expanded position. Accordingly, it is advantageous to have the damping device provide a correspondingly diminishing damping force, such that the damper and the spring cooperate to provide a substantially constant opening force.

In all aspects the housing may engage with a base plate. It is preferred that the housing is releaseably detachable from said base plate. Typically, the base plate is mounted to the furniture item, with the movement control device mounted thereon. Providing a mechanism that allows the movement control device to be forceably detached when it suffers from a severe impact, such as when the door or drawer is slammed shut, prevents damage to the device. It is a straightforward matter to to re-attach the movement control device.

It is preferred that the housing and base plate each comprise complimentary nosings that clip together with a resistance fit. Preferably the nosings are inclined to aid connection and release of the housing with the base plate.

It is particularly preferred that the housing is caused to detached from the base plate during lateral over-forcing in a direction substantially perpendicular to the longitudinal axis of the push rod.

In order that the present invention be more readily understood, specific embodiments thereof will now be described with reference to the accompanying drawings.

BRIEF DESCRIPTION OF THE DRAWINGS

FIG. 1 shows a perspective view of a movement control device in accordance with a first embodiment. The housing is shown separated to allow sight on the push rod mounted therein.

FIG. 2 shows a perspective view of the push rod. The view in this figure has been rotated 180° with respect to the view in FIG. 1.

FIG. 3 shows a mounting plate.

FIG. 4 shows the lower section of the housing, with the push rod removed.

FIG. 5 shows a first cross section of the movement control device in accordance with the first embodiment. The push rod is located in a position typically when the cabinet door is closed.

FIG. 6 shows a second cross section of the movement control device in accordance with the first embodiment.

FIG. 7 shows the first cross section of the movement control device in accordance with the first embodiment. The push rod is located in a position typically when the cupboard door is open. A representation of the cabinet and door is shown for context.

DESCRIPTION OF SPECIFIC EMBODIMENTS

Figure 8:
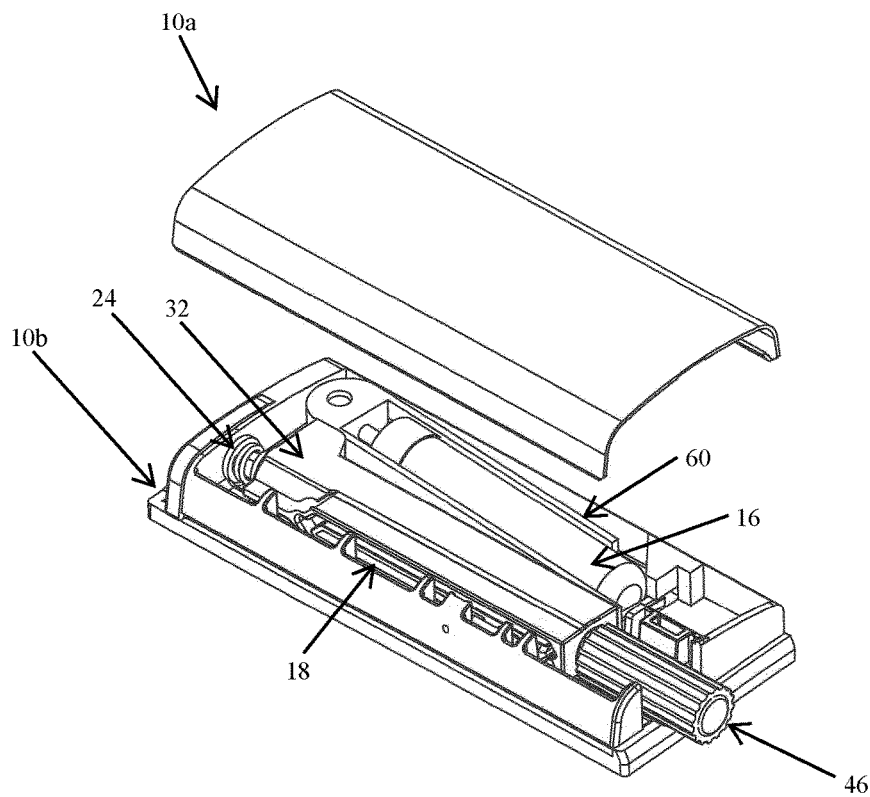
FIG. 8 shows a perspective view of a movement control device in accordance with a second embodiment. The housing is shown separated to allow sight on the push rod mounted therein.

FIG. 1 shows a movement control device commonly known as a touch latch. Touch latches are typically used in furniture applications to assist with controlling movement of components such as drawers and doors. In particular, they facilitate opening and closing of such components by simply pushing on them in known manner.

A first embodiment is described in relation to FIGS. 1 to 7. The movement control device comprises a housing 10. In FIG. 1 the housing is shown separated, with a top section 10a and bottom section 10b. A push rod 12 is mounted for reciprocal movement inside the housing 10. As seen in FIG. 2, the push rod includes a hollow bore 14. Said bore 14 extends substantially throughout the length of the push rod 12. Accordingly, the push rod 12 itself can function as the housing for the damper 16. The damping device 16 is typically a linear damping of the piston and cylinder type. The damping device 16 engages with the housing 10 at one end thereof. This arrangement can be readily seen in FIGS. 5 and 7.

Alternatively, a discrete damping device 16 could be inserted into the push rod bore 14.

The push rod 12 is operable to move between a first position and a second position. In the first position, the push rod 12 is retracted into the housing 10. A portion of the portion rod 12 still protrudes through the housing 10. This position is shown in FIGS. 1 and 5. In the second position the push rod is extended out of the housing. This position is shown in FIG. 7.

FIGS. 5 and 7 also illustrate the working action of the damping device 16. As stated, the push rod 12 is configured to function as the housing of the damping device 16. Two chambers are provided: a high pressure chamber 50 and a low pressure chamber 52. During the working stroke of the damper 16, damping fluid is forced from the high pressure chamber 50 to the low pressure chamber 52. Thus, in FIG. 5, the damping fluid is substantially located within the high pressure chamber 50, and during the action of the damping device 16, the damping fluid is passed into the low pressure chamber 52.

Utilizing the push rod as the damper housing is advantageous in that the overall length of the movement control device can be reduced.

A volume compensator 54 is provided at the end of the bore 14. This may be a compressible material. As we will be seen from a comparison between FIGS. 5 and 7, the volume compensator is of reduced volume in the first position (i.e. it is compressed) compared to the second position. The volume compensator 54 is located at the low pressure chamber 52 due to the reverse damping function of the movement control device (i.e. the movement control device damps an opening of a door or drawer, rather than a closing of such).

The push rod 12 also comprises an indexing mechanism 18 that is operable to maintain the push rod in either the first or second position after a compression or expansion stroke.

The indexing mechanism 18 comprises a guide track 20 and a latch 22. Operation will be described in more depth below.

A spring 24 is provided in the housing 10, to one side of the push rod 12.

The push rod 12 comprises a flange 26, which comprises a through-bore 28. A guide rod 30 is provided in the housing 10. The spring 24 and flange 26 are configured to be able to travel over the guide rod 30. The provision of a guide rod 30 ensures that the spring 24 stay on its operational axis. The spring 24 is a compression spring that seeks to push the flange 26 along the guide rod 30. Accordingly, this action is seeking to urge the push rod 12 to its second position.

By providing the spring 24 to one side of the push rod 12, the length of the device can be reduced compared to a similar with push rod, damper and spring that are all co-axial.

A smooth opening action is achieved by providing a damping device that engages with the push rod 12 throughout its path of travel. Furthermore, by providing controlled damping of the push rod 12 on its entire working stroke, forces on the latch 22 are reduced, which provides for a longer working lifetime of the device.

FIGS. 5 to 7 show the internal structure of the movement control device. It will be apparent from comparing FIGS. 5 and 7 that the damper has a working stroke that corresponds substantially to the distance travelled by push rod 12 between the first and second positions. Accordingly, the damping device 16 acts upon the entire working stroke of the push rod 12.

The bore 14 in push rod 12 extends nearly the whole length thereof. Accordingly, the working stroke of the piston of the damping device 15 (illustrated by length X in FIG. 7) can be extended through almost the whole length of the push rod 12. To achieve this effect, it is preferred that the length X is greater than or at least equal to length Y (illustrated in relation to both FIGS. 5 and 7), being the distance travelled by push rod 12 between the first and second positions.

The spring 24 is typically a compression spring. The force exerted by the spring 24 will reduce as it moves from its most compressed state to its most expanded state. Thus the force exerted on the flange 26 will reduce as the push rod 12 is moved from the first position to the second position. To ensure a smooth damping function, the damping device 16 may be configured to provide a damping function that reduces along its working stroke.

A second embodiment will now be described with reference to FIGS. 8 to 10. In this arrangement the spring 24 is co-axial with the push rod 12. The push rod 12 comprises a hollow bore that receives, or at least partly receives, the spring 24. The spring 24 seeks to urge the push rod 12 from a closed position to an open position.

The push rod 12 comprises a first end that engages the door or drawer of the furniture product and a second end that is retained within the housing 10 at all times. A flange 32 located at the second end of the push rod 12, as clearly illustrated in each of FIGS. 8 to 10. It would be possible to locate the flange further along the push rod 12, but having the flange 32 at the second end of the push rod 12 allows the flange to operate along the full working stroke of the push rod.

Figure 9:
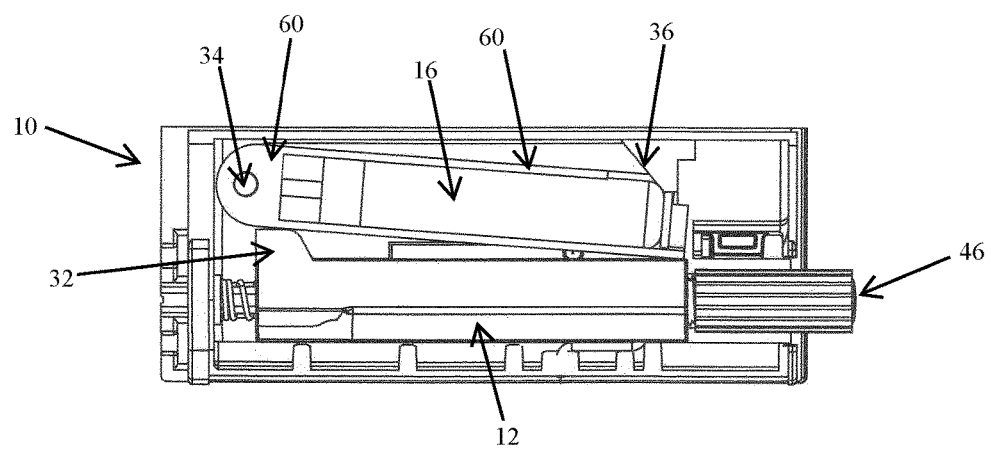
FIG. 9 shows a plan view of the movement control device in accordance with a second embodiment. The push rod is in a retracted position.

FIG. 9 shows a plan view of the movement control device according to a second embodiment, with the push rod 12 in the closed position. Or, in other words, the configuration of the movement control device when the drawer or door is closed.

Figure 10:
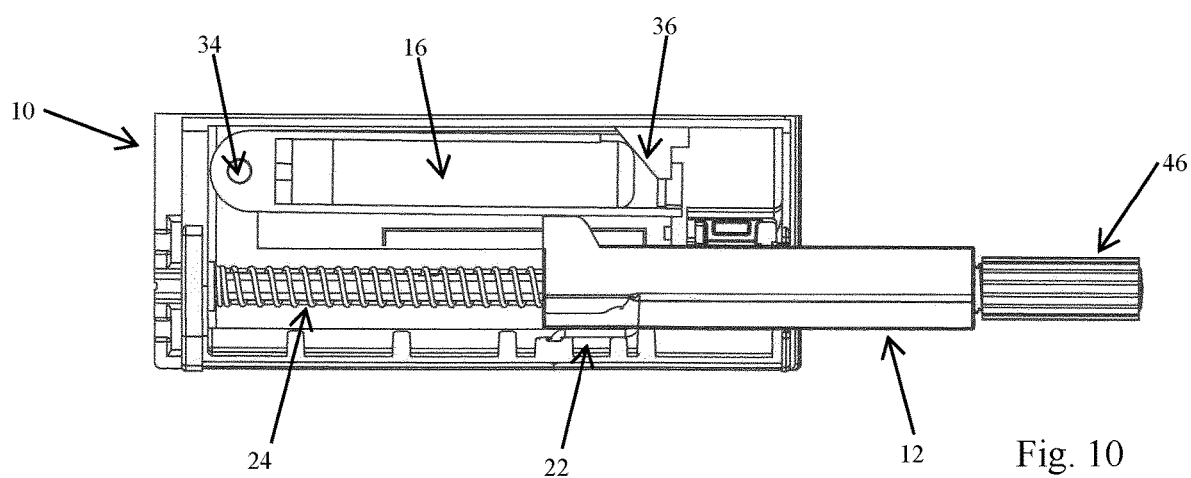
FIG. 10 shows a plan view of the movement control device in accordance with a second embodiment, with the push rod in an extended position.

FIG. 10 shows the same device with the push rod 12 in the open position, or, the configuration of the movement control device when the drawer or door is open.

A damping device 16 is pivotally mounted within the housing about pivot 34. In the closed position the damping device 16 is provided at an acute angle with the push rod 12. Typically the damping device will be a piston and cylinder device.

A camming surface 36 is provided within the housing 10.

The flange 32 engages with the damping device 16 during the working stroke of the push rod 12. As the push rod 12 travels from the closed position to the open position, the flange forces the damping device to rotate about the pivot 34. The damping device 16 is thus urged against camming surface 36. This action causes the damping device to be compressed, thus causing the damping action.

The damping device 16 may be mounted within a casing 60. The casing 60 may be pivotally mounted in the housing 10. At least one of a damper housing or piston rod is slideable with respect to the casing 60, and thus the damping device 16 can be compressed when it is urged against the camming surface 36.

In this embodiment the spring 24 is located co-axially with the push rod 12, but the damping device 16 is located to one side. By provided the damping device 16 out of the primary axis of the push rod allows the movement control device to be made shorter in length.

It will thus be apparent in the second embodiment that the damping device 16 is operable to rotate between a first position and a second position. In preferred embodiments the first position is angled with respect to the longitudinal axis of the push rod 12. As the flange pushes the damper, the damping device 16 is urged into a position substantially parallel to the longitudinal push rod 12.

It will be appreciated that the further the flange 32 travels away from the pivot 34, the strong the force exerted by the flange 32 on the damper 16 will be. Thus, whilst the force exerted by the spring diminishes as the spring expands, the force exerted by the flange on the damper increases. The result is a smooth, substantially constant force exerted on the damper device during the working stroke of the spring 24.

The arrangements of both the first and second embodiments are advantageous in that the damper is engaged with the push rod substantially throughout the entire path of travel of the push rod. This results in the damper being operable to affect the push latch throughout the opening operation. It is known to provide a damper out of the push rod axis, but that does not engage throughout the whole operational stroke of the push rod. Such an arrangement can cause a violent initial opening before the damper takes effect. Such as arrangement can cause stress on the indexing mechanism, which ultimately may deleteriously affect the working of the push latch 22.

Both the first and second embodiments may be adapted to fit with a mounting plate 38. FIGS. 3 and 4 show the mounting plate and the lower section of the housing 10, respectively. It will be appreciated that the second embodiment would incorporate these features in exactly the same way. This arrangement is advantageous in that it prevents damage to the device if the door or drawer is slammed shut. Specifically, the engagement of the housing 10 and the mounting plate is designed to allow the movement control device to be released from the mounting plate during severe closing impact. The base plate comprises inclined noses 40 that are flexible, respectively, in directions A and B, as shown in FIG. 3. The lower section 10b of the housing 10 comprises inclined noses 42 that cooperate with those on the base plate. Thus, if the movement control device is released from the base plate after a severe impact, it is straightforward to re-clip the damper onto the mounting plate.

Specifically, the housing is caused to detached from the base plate during lateral over-forcing in a direction substantially perpendicular to the longitudinal axis of the push rod. This direction is illustrated in FIG. 3 by the arrows (A,B).

The mounting plate 38 typically comprises one or more screw holes to allow it be fixed to the inside of cupboard or draw. A locating flange 44 may be provided to aid positioning the mounting plate in the furniture item.

Operation of the indexing mechanism will now be described. This arrangement is known from WO2019/064061, the contents of which are hereby incorporated by reference.

Movement of the push rod 12 is governed by an indexing mechanism 18. The indexing mechanism 18 is seen in FIGS. 11 to 15 and comprising a latch 22 and a guide track 20. The latch 22 is of circular rod section bent into a generally known Z-shaped formation, with its ends extending perpendicularly in opposite directions to either side of its central portion. One of the ends 22a is engaged in a hole in the housing 10, which acts as a fulcrum for the latch 22 to pivot about. The other end 22b is engaged in the guide track 20, which is mounted on or forms part of the push rod 12. Latch 22, and both ends 22a, 22b thereof, are also shown in FIGS. 5 and 7. The guide track 20 is in the general shape of an elongate loop with straight sections 20a and 20b extending between latching pockets 20c and 20d.

Figure 11:
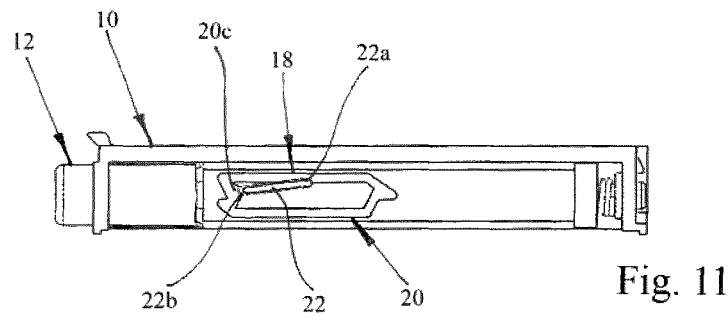
FIGS. 11 to 15 show operation of an indexing mechanism that may be incorporated into both the first embodiment and the second embodiment.

FIG. 11 shows the indexing mechanism 18 with the device in its loaded condition, and here the push rod 12 is being held in its innermost position in the housing 10 by the latch 22 held by its end 19b in latching pocket 20c. This is the normal condition of the device when the drawer or door of the furniture item is closed.

Figure 12:
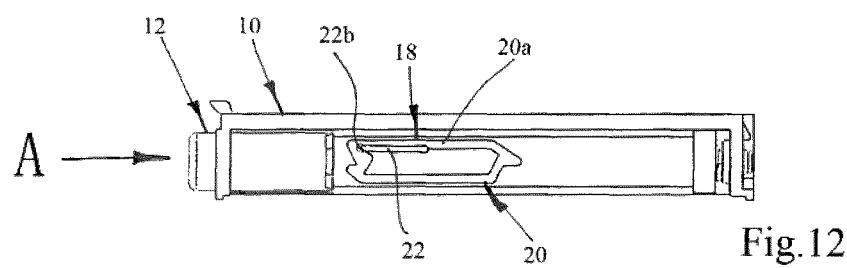
Figure 13:
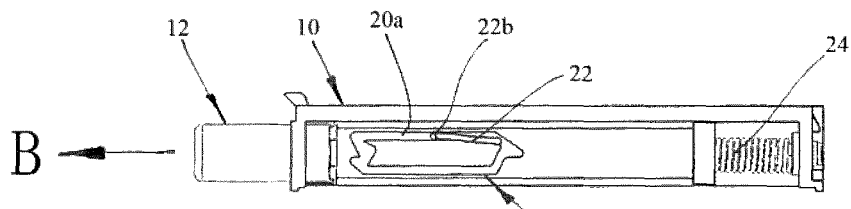
Figure 14:
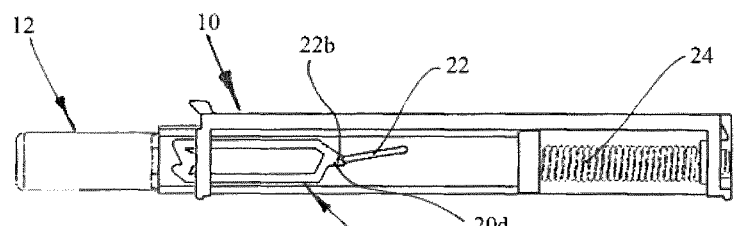
Figure 15:
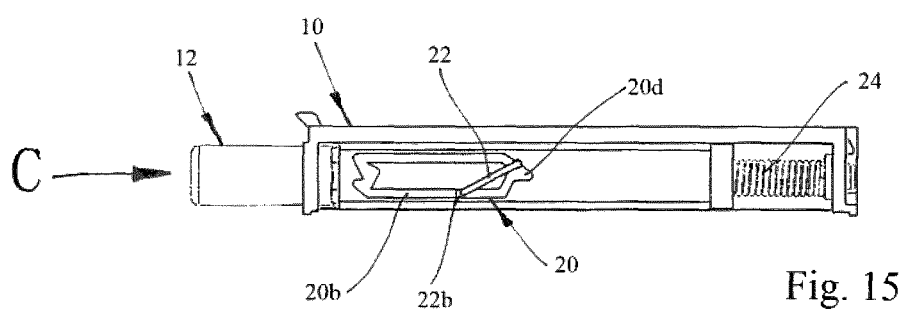

To open the drawer or door, a small pushing force is applied to it, producing a force on the push rod 10, illustrated by arrow A in FIG. 12. This causes the latch 22 to move along the guide track 20 towards its straight section 20a. This frees the push rod 12 to move out of the housing under the biasing action of the spring 24. This movement of the push rod 12 is seen in FIG. 13 illustrated by arrow B.

The push rod 12 will continue to move out of the housing 10 until the latch 22 engages latching pocket 20d with its end 19b. This is the position illustrated in FIG. 14, which is the fully extended condition of the device. This is the condition that the device will be in when the drawer or door is open.

Closure of the drawer or door will re-set the device. This is seen occurring in FIG. 15, where closing movement of the drawer or door will impart a force on the push rod 12 illustrated by arrow C. This will cause the latch 22 to move along the guide track 20, with its end 22b coming out of engagement with latching pocket 20d and onto the straight section 20b. This movement will continue until latch 22 engages with its end 22b in latching pocket 20c, with the spring 24 now fully compressed, which is back to the loaded condition of the device seen in FIG. 11.

The device preferably incorporates a mechanism for adjusting the extent to which the push rod 12 protrudes out of the housing 10. For example, the push rod 10 may be provided with a screw-threaded end section 46 to enable its overall length to be adjusted. This enables the device to be tailored to suit the furniture item in use, to ensure correct closure and opening movement of its drawer or door. The screw-threaded end section 46 may be tethered via an internal anchor to ensure that it cannot be removed from the push rod 12. It will be appreciated that the screw-threaded end section 46 is not shown in FIG. 2.

If a mounting plate 38 is not used, the housing 10 may comprises a flange 44 to aid locating the movement control device on the furniture item. In this case, screw holes could be positioned on additional side flanges.

By providing a movement control device according to the present invention, a push latch that is of small size, that provides a controlled drawer/door opening and is of robust design is provided.

It will be appreciated that the above embodiments are described by way of background only, and that many modifications and variations are covered by the appended claims.

The invention claimed is:

1. A movement control device comprising:
   a housing;
   an elongate push rod mounted in the housing for reciprocal movement along a longitudinal axis between a first position and a second position, wherein the push rod extends out of said housing in both the first position and the second position;
   a compression spring comprising a primary axis operable to provide a biasing force on the push rod; and
   a damping device comprising a primary axis, wherein the damping device is in direct or indirect substantially continuous engagement with the push rod through its reciprocating movement,
   wherein the primary axis of the compression spring and the primary axis of the damping device are not coaxial, and
   wherein the primary axis of the damping device is coaxial with the longitudinal axis of the push rod.

2. The movement control device of claim 1, comprising an indexing mechanism for controlling movement of the push rod relative to the housing.

3. The movement control device of claim 2, wherein the indexing mechanism is operable to maintain the push rod in either the first position or the second position.

4. The movement control device of claim 1, wherein the push rod comprises a hollow bore such along the longitudinal axis and the hollow bore forms a housing of the damping device.

5. The movement control device of claim 4, wherein the damping device is a linear damper comprising a piston.

6. The movement control device of claim 5, wherein the piston comprises a working stroke that is substantially at least as long as a travel path of the push rod between said the first position and the second position.

7. The movement control device of claim 1, wherein the primary axis of the compression spring is substantially parallel to the longitudinal axis of the push rod.

8. The movement control device of claim 7, wherein the push rod comprises a flange, wherein the compression spring is retained between the flange and the housing.

9. The movement control device of claim 8, wherein the compression spring pushes on the flange to move the push rod from the first position to the second position.

10. The movement control device of claim 9, wherein the damping device is configured to provide a degressive damping force on the push rod as it moves from the first position to the second position.

11. The movement control device of claim 1, wherein the compression spring is mounted at least partially within the push rod.

12. The movement control device of claim 11, wherein the damping device is mounted in the housing to one side of the push rod.

13. The movement control device of claim 12, wherein the damping device is pivotally mounted within the housing.

14. The movement control device of claim 13, wherein movement of the push rod causes rotational movement of the damping device.

15. The movement control device of claim 11, wherein the push rod comprises a flange that is operable to engage the damping device, such that primary axis of the damping device is caused to rotate with respect to the longitudinal axis of the push rod as said push rod moves from the first position to the second position.

16. The movement control device of claim 15, wherein the primary axis of the damping device and the longitudinal axis of the push rod define an acute angle when the push rod is in the first position, and the primary axis of the damping device and the longitudinal axis of the push rod are substantially parallel when the push rod is in the second position.

17. The movement control device of claim 13, wherein the damping device is mounted within a casing, said casing being pivotally mounted in said housing, and wherein the damping device comprises a damper housing and a damper piston and at least one of the damper housing or the damper piston is slidably mounted in said casing.

18. The movement control device of claim 1, comprising a base plate that is releasably engagable with the housing.

19. The movement control device of claim 18, wherein the base plate and the housing comprise complimentary nosings that allow the housing to releasably clip into the base plate.

20. The movement control device of claim 18, wherein the housing is caused to detached from the base plate during lateral over-forcing in a direction substantially perpendicular to the longitudinal axis of the push rod.

21. A movement control device comprising:
a housing;
an elongate push rod mounted in the housing for reciprocal movement along a longitudinal axis between a first position and a second position, wherein the push rod extends out of said housing in both the first position and the second position;
a compression spring comprising a primary axis operable to provide a biasing force on the push rod; and
a damping device comprising a primary axis, wherein the damping device is in direct or indirect substantially continuous engagement with the push rod through its reciprocating movement, wherein
the primary axis of the spring and the primary axis of the damping device are not coaxial,
wherein the compression spring is mounted at least partially within the push rod,
wherein the damping device is pivotally mounted in the housing to one side of the push rod, and
wherein the damping device is pivotally mounted within the housing.

22. A movement control device comprising:
a housing;
an elongate push rod mounted in the housing for reciprocal movement along a longitudinal axis between a first position and a second position, wherein the push rod extends out of said housing in both the first position and the second positions;
a compression spring comprising a primary axis operable to provide a biasing force on the push rod;
a base plate that is releasably engagable with the housing; and
a damping device comprising a primary axis, wherein the damping device is in direct or indirect substantially continuous engagement with the push rod through its reciprocating movement,
wherein the primary axis of the compression spring and the primary axis of the damping device are not coaxial.

* * * * *